Sept. 11, 1934.  J. ANKCORN  1,973,195
SANDWICH MAKING MACHINE
Filed Feb. 1, 1933   4 Sheets-Sheet 1

INVENTOR
JOHN ANKCORN
BY
ATTORNEY

Sept. 11, 1934. J. ANKCORN 1,973,195
SANDWICH MAKING MACHINE
Filed Feb. 1, 1933 4 Sheets-Sheet 2

INVENTOR
JOHN ANKCORN
BY
ATTORNEY

Sept. 11, 1934.   J. ANKCORN   1,973,195

SANDWICH MAKING MACHINE

Filed Feb. 1, 1933   4 Sheets-Sheet 3

INVENTOR
JOHN ANKCORN
BY
ATTORNEY

Sept. 11, 1934. J. ANKCORN 1,973,195

SANDWICH MAKING MACHINE

Filed Feb. 1, 1933   4 Sheets-Sheet 4

INVENTOR
JOHN ANKCORN
BY
ATTORNEY

Patented Sept. 11, 1934

1,973,195

UNITED STATES PATENT OFFICE 1,973,195

SANDWICH MAKING MACHINE

John Ankcorn, Portland, Oreg.

Application February 1, 1933, Serial No. 654,777

12 Claims. (Cl. 107—1)

My invention has for its particular object the provision of a machine substantially automatic in its nature by which sandwiches can be selectively assembled and wrapped and for this reason is particularly adapted for coin operation,— that is, it is adapted for vending machines.

It is essential in a machine of this character that some selection be afforded, not only for choice of bread to be used, but also the sandwich filling and to this end it is necessary to maintain supplies of various breads such as rye bread, white bread and wholewheat bread, as well as the sandwich filling materials and means must be provided for selectively arranging said materials to make various combinations.

The details of construction of my improved machine and the method of operation thereof are hereinafter described with reference to the accompanying drawings, in which.

Figure 1:
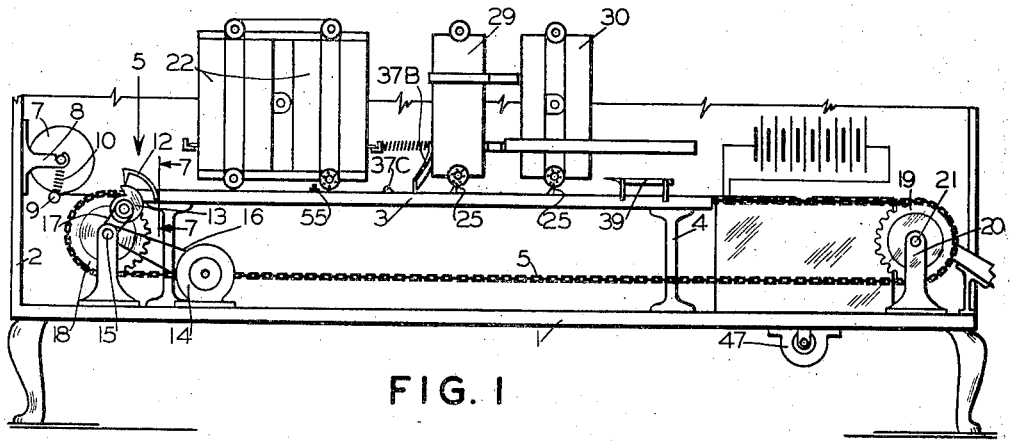
Fig. 1 is a substantially diagrammatic elevation of said machine.

My improved machine is carried by a frame 1 and preferably is completely housed within a container 2 shown in fragmentary detail in Fig. 1, the remainder of said container being broken away to disclose the mechanism. Said container is preferably of frame construction and, in the main, the elements of the container are glass, so that the purchaser of sandwiches can see the mechanism and the materials going to make up the sandwich. A table 3 or guiding surface extends substantially the entire length of the machine and is supported upon the frame by leg members 4. Extending along the sides of said table is a pair of continuous chains 5, each chain extending along one of the sides of said table and encircling the latter. That is, said chains are looped about the table one portion of the loop overlying the table and the return portion of said chain passing underneath said table, as is shown in Fig. 1.

Figure 7:
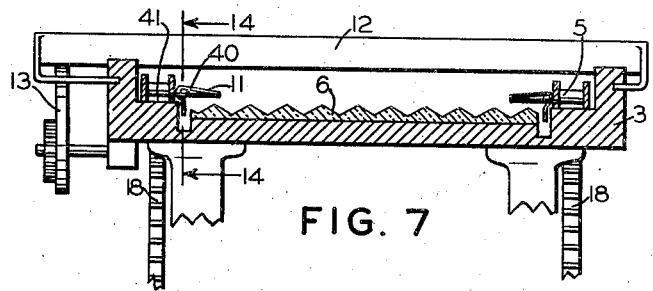
Fig. 7 is an enlarged transverse sectional view showing a fragmentary section of the table thereof, or guiding surfaces along which the various materials are passed and upon which they are assembled.

Said table 3 preferably has a covering of glass 6, which is longitudinally corrugated, as is shown in Fig. 7. The corrugations promote sanitation and also limit the frictional drag of the materials as they pass over said table. A roll of waxed paper 7 is arranged at the forward end of said machine, being carried by brackets 8 supported by the side walls of said container and said roll of paper is preferably maintained in a relatively tight roll by an idler bearing against the periphery of said roll and is held by the tension of a spring 10, as is shown in Fig. 1. Paper removed from said roll extends in a web flatwise over the glass surface 6.

Opposed pairs of nippers 11 extend laterally from the chains 5 and engage the sides of said paper and move the latter lengthwise of the top 6. Periodically a knife element 12 severs said web of paper and the separated sections are moved along. The remainder of said web remains until successive nippers unroll a further length of paper from the roll and the knife 12 severs the same. Said knife preferably is pivotally mounted to the table top, as is shown in Fig. 1, and is gravity actuated. A cam 13 periodically lifts said knife and permits the latter to drop so that its cutting edge passes thru the plane of the path of said web of paper. All of the conveying and severing mechanism is operated by an electric motor 14 carried by the frame 1. Said motor drives a transverse shaft 15 by a chain 16, and said shaft drives the cam 13 by a chain 17. The sprockets 18 are fixed to said shaft 15 and said sprockets engage the chains 5 and drive them. The sprockets 19 at the discharge end of said machine are journaled between bearings 20 and upon a shaft 21 and thus are mere idlers.

Figure 15:
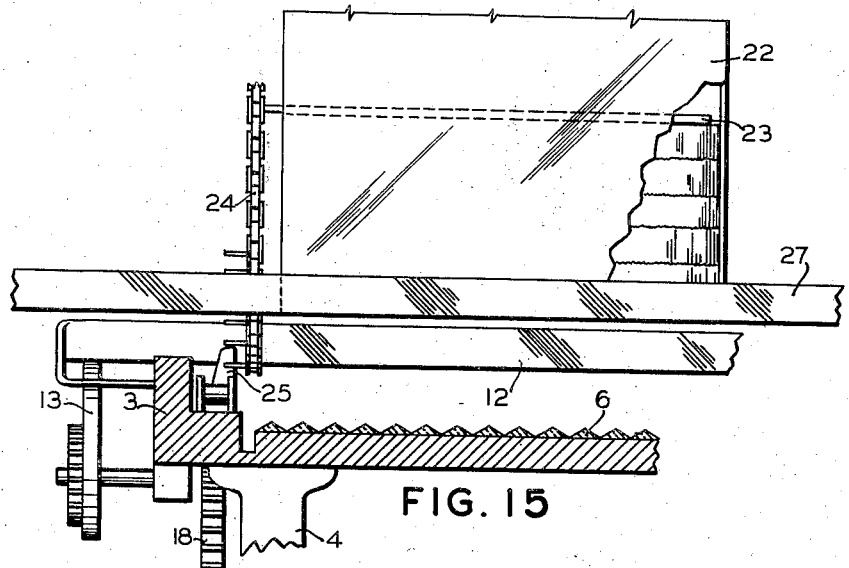
Fig. 15 is a transverse section taken substantially in the same plane as Fig. 6, showing but one of said bread compartments, a portion of said compartment being shown broken away.
Figure 16:
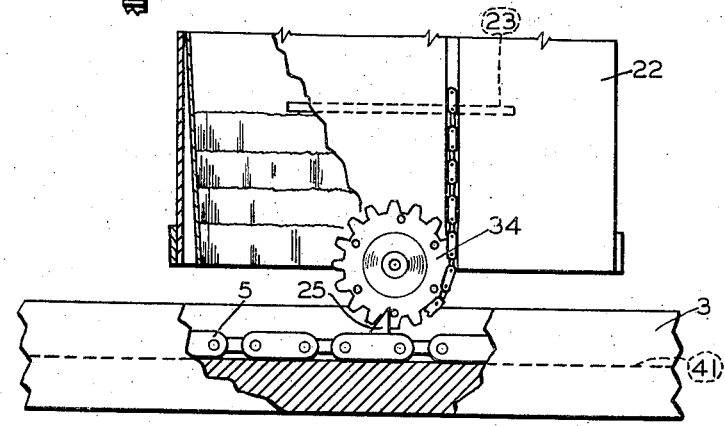
Fig. 16 is a side elevation with portions of said bread compartment and driving mechanism therefor shown broken away.

I preferably provide a series of laterally alined containers 22 for bread to be used in the sandwiches and said bread is wedged sufficiently tightly in said containers to be held against the action of gravity, thus to prevent the inadvertent discharge of said slices. In each of said containers is a transverse member 23, which engages the top of the stack of bread. The transverse members 23 are each carried by a chain 24 and each member is moved upwardly and downwardly by its chain 24. A chain 24 is arranged upon each of the containers 22 and each chain carries one of said transverse members 23. Each of said chains 24 is looped about a sprocket which operatively engages said chain and the chain on each pair of longitudinally alined containers 22 is operatively connected with and synchronized by a transverse chain extending across the top of said container 22, as is shown in Fig. 1. One of each pair of said sprockets carries outstanding pins, as is shown clearly in Fig. 15. Said pins are engageable with lugs 25 carried by the chain 5. The pins upon said sprockets are spaced apart a distance equal to the thickness of a slice of bread and the lugs 25, moving along with the chain 5, thus feed the transverse members 23 downwardly a distance equal to a slice of bread within said container 22, and deposit a slice of bread from each of the pair of containers 22 simultaneously upon the section of waxed paper lying upon the top 6.

Figure 2:
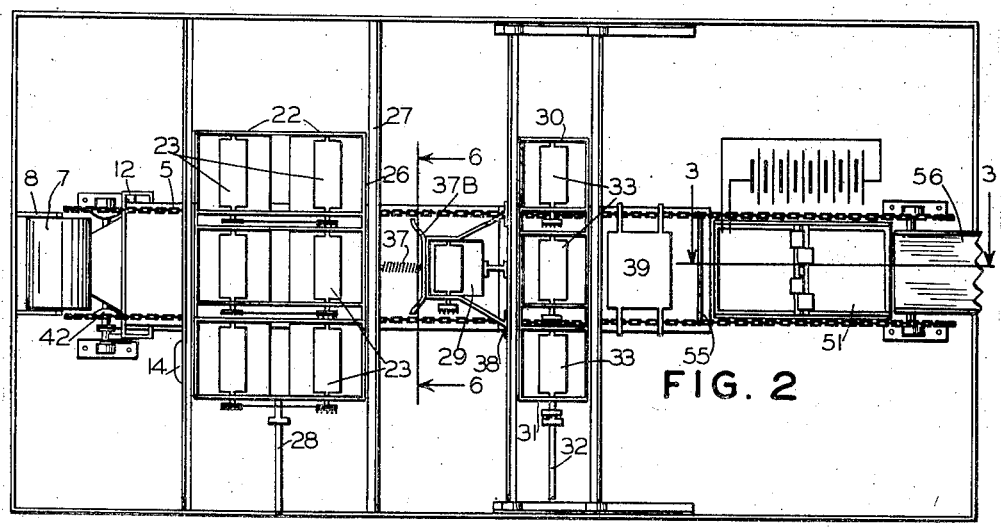
Fig. 2 is a plan view thereof.

Inasmuch as the containers 22 are arranged in pairs, as is shown in Fig. 2, and the action of the lugs 25 effects the discharge of two slices of bread from the alined containers simultaneously, two slices of bread, correctly spaced, are deposited upon the sheet of waxed paper. Thus each pair of containers is filled with slices of bread of the same character. That is, as is viewed in Fig. 2, the containers arranged above the conveyors might contain white bread, the ones in alinement might contain wholewheat bread, and the ones below said conveyers might contain rye bread.

All of said containers are connected by a continuous transverse member 26 and said containers slide along transverse frame members 27. Thus a single operating lever 28 can arrange the containers into and out of alinement with the conveying mechanism, although each of the containers is provided with separately operable feeding mechanism.

Figure 8:
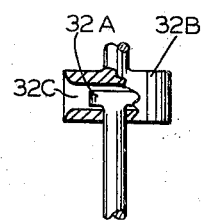
Fig. 8 is a fragmentary view of a detail of construction.

After two slices of bread have been arranged upon the web of paper, the nippers 11 draw said web under the containers holding butter and sandwich filling material. There is but one butter container 29 and a plurality of containers 30 for said sandwich material. In the drawings, three containers are shown. Said containers 30 are laterally movable upon the frame 31 in the same manner as are the containers 22, that is by a single operating lever 32. The operating lever differs, however, in that it is not continuous but is separable and the parts are joined by the knob-like end 32a of one engaging the cup-like end 32b of the other. A relatively restricted slot 32c is arranged in the cup-like end and surrounds the shank of the end 32a, while the enlarged knob-like end seats in the cup 32b. This permits the frame 31 to be shifted longitudinally of the machine without affecting the operating lever 32. When the frame is returned to its original position by the coil spring 37, the parts are again arranged in engagement in the manner shown in Fig. 8, so that the containers 30 can be shifted laterally.

Said containers 30 are likewise connected together but each is provided with separate feeding elements 33, each driven by chain-and-sprocket elements 34. The lugs 25 on the chains 5 also are adapted to actuate said feeding mechanism in the same manner as the feeding mechanism in the bread containers and thus each time a sandwich is passed under one of said containers the container which is alined therewith is fed so that the next succeeding layer of sandwich material is presented to the cutting mechanism.

It is to be noted that the advance lug lies closer to the edge of the table 3 than does the trailing lug. The forward lug thus is adapted to actuate the foremost bread container and the alined container of sandwich material. The trailing lug is adapted to actuate the butter containers. The degree of rotation of the sprockets and thereby the feed chains is determined by the spacing of said sprockets from the table top. The sprockets for the bread containers extend but a short distance from said top while the butter and sandwich spread extend a greater distance therefrom. The latter are in contact with the lugs for a lesser interval of time and thus are rotated a shorter distance.

Figure 4:
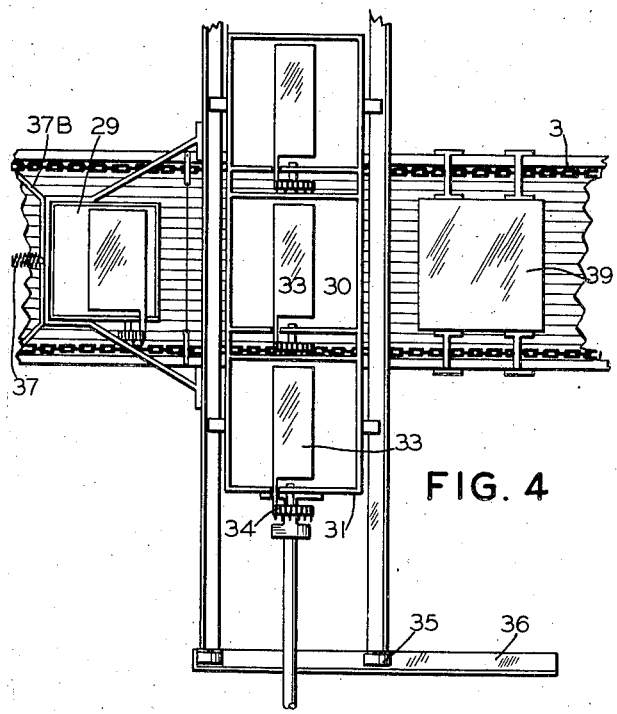
Fig. 4 is a fragmentary enlarged plan view showing the containers for the sandwich filling material and butter and the slicing mechanism therefor.
Figure 5:
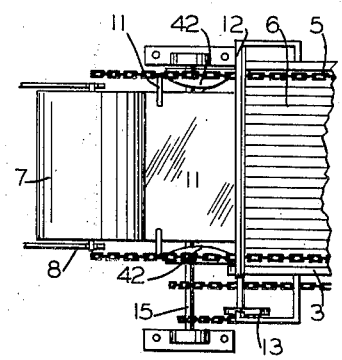
Fig. 5 is a similar plan view taken in the direction of the arrow 5 in Fig. 1 and shows the forward end of said machine.
Figure 6:
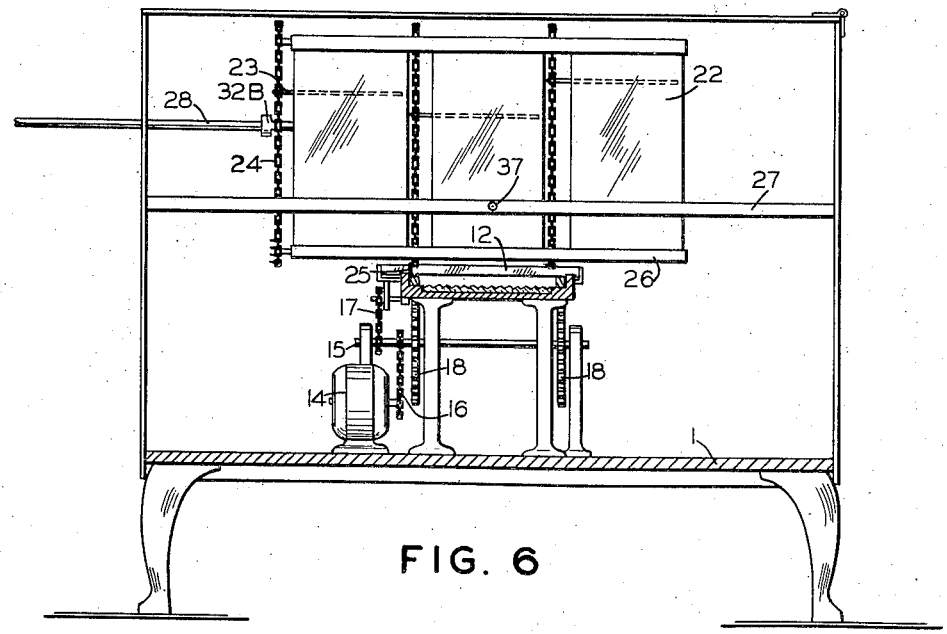
Fig. 6 is a transverse sectional view taken substantially on the line 6—6 in Fig. 2 thru the containers for bread.

The frame 31 is mounted upon rollers 35 which operate in longitudinally-extending tracks 36. Said tracks are of sufficient length to permit a section of sandwich material and a section of butter to be severed by the cutting mechanism. As is shown in Figs. 1, 2 and 4, said frame is retracted by a coil spring 37 and thus when the frame reaches the end of its travel in presenting the materials to the various cutting elements, the lugs are disengaged and the spring retracts the frame to its original position. The butter container is carried by said frame as well as the containers for the sandwich material and cutting wire 38 for the butter is arranged in advance of the butter container a distance equal to the forward or cutting edge of the knife 39 for the sandwich material. Thus said quantities of butter and sandwich material to be removed fall simultaneously to the pieces of bread which lie beneath them.

Cams 37a lie adjacent the chains 5 and are adapted to swing pivotally-mounted rocker lugs 37c which engage a transverse bar 37b carried by the butter container 29. This operative connection causes the butter container and the sandwich containers to be moved along with the slices of bread during the period when butter and sandwich material are being deposited upon said bread slices. Said cams 37a rock reversely and permit their disengagement with the bar 37b at the end of the cutting stroke. The spring 37 may then retract the container 29 and bar 37b to the positions they originally occupied.

In the apparatus shown, a quantity of sandwich material will fall upon and be in exact registry with one section of bread and a corresponding section of butter will be deposited on the other section of bread to make up one sandwich. That is, said parts are arranged so that when the two pieces of bread which go to make up one sandwich are in registry with the containers for the sandwich material and butter respectively, the lugs carried by the chains 5 move the web of paper, pieces of bread and sandwich material along at the same speed until the butter and sandwich material has been severed and lies upon the pieces of bread. The lugs then are released from engagement with the containers last mentioned and the latter carried by the frame 31 are returned to position by the coil spring 37. It is to be understood, however, that my invention contemplates as well mechanism which will deposit both butter and sandwich material on each slice of bread, such being a mere matter of selection and multiplication of lugs and corresponding operating parts. The knife 39 is preferably sharpened so that its upper face is plane and its lower face beveled and preferably hollow ground, as I find that this type of knife severs the sandwich material best.

Figures 12, 13:
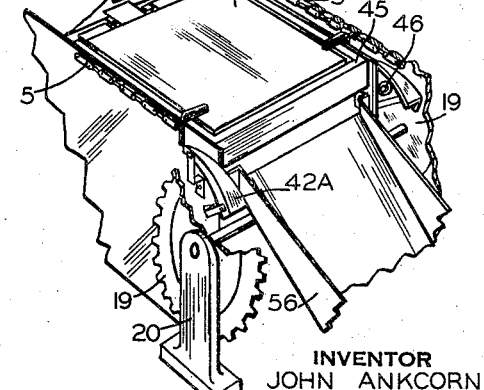
Figs. 12 and 13 are perspective views broken away to disclose details of the forward and discharge ends of said machine respectively.

The nippers 11 which engage the web of waxed paper are preferably spring closed. Said nippers are arranged scissor-fashion with one leg secured to the chain 5 and the other hanging pendent as is shown in Fig. 7. The pendent leg is spaced from the vertical edge 40 of the side walls of the table, which vertical edge lies just inside of the shelves 41, which carry the chain at each side of the table. An element 42 adjacent the paper severing knife 12 tends to rock said nippers so that they are spaced from each other and are adapted to engage said web. Said member is of relatively short length, as is shown in Fig. 12, and terminates shortly and thus enables the spring-closed nippers to engage the web. Other elements 42a are arranged at the discharge end of the machine, as is shown in Fig. 13, and also are positioned to engage the pendent leg of the nippers to space the engaging elements thereof from each other and to release the web of paper.

Lying intermediate said knife and the end of said guide rails is a folding element comprising two leaves 43 and 43a, which are arranged substantially in alinement with the table 3. Said leaves are joined by a pivot pin 44 and each leaf is surrounded on three sides by an upstanding walled portion 45 substantially as high as the thickness of a slice of bread. The leaves are separated a distance corresponding to the spacing between the pieces of bread and the elements 42a lie just beyond said trailing edge of the right-hand leaf shown in Fig. 3. This disengages the chains 5 from the web of paper and the parts of the sandwich carried thereby and leaves them in registry with the folding and wrapping apparatus. Simultaneously an electric time switch 46 is closed by the rocker lugs 37c, which close the electric circuit to an electric motor 47. The rotation of said motor tends to cause said leaves to collapse and to fold the two halves of the sandwich upon each other, the parts assuming the positions indicated in dotted lines in Fig. 3. The crank arm 48, actuated by said motor, and the connected rod 49 joined thereto, are proportioned to cause said leaves to abut against each other and then to return to their original positions. An electric heating or resisting unit 50 is embedded in the upstanding walled portion 45 and thus when said walled portions come into abutment with each other, the waxed web of paper is melted slightly and the pressure tends to cause said portions of slightly melted waxed paper to adhere to each other and thus to provide a sealed envelope for the sandwich.

Figure 9:
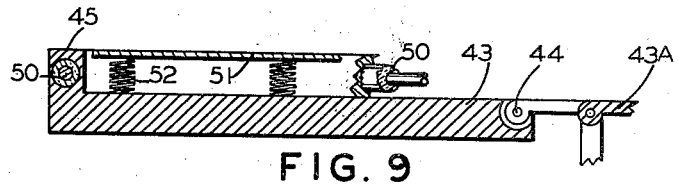
Figs. 9, 10 and 11 are fragmentary views illustrating folding and wrapping mechanism.

The fold in said paper is at the middle thereof and thus it is necessary to seal said web of paper only upon three sides. To prevent the sandwich from being seated tightly in one of said leaves, I provide a false bottom 51 in each leaf. Said false bottom is normally held in the position shown in Fig. 9 of the drawings by coil springs 52. The springs are sufficiently resilient, however, to permit the sandwiches to force said false bottom downwardly so as not to crush said sandwich during the folding and sealing operation.

Figure 3:
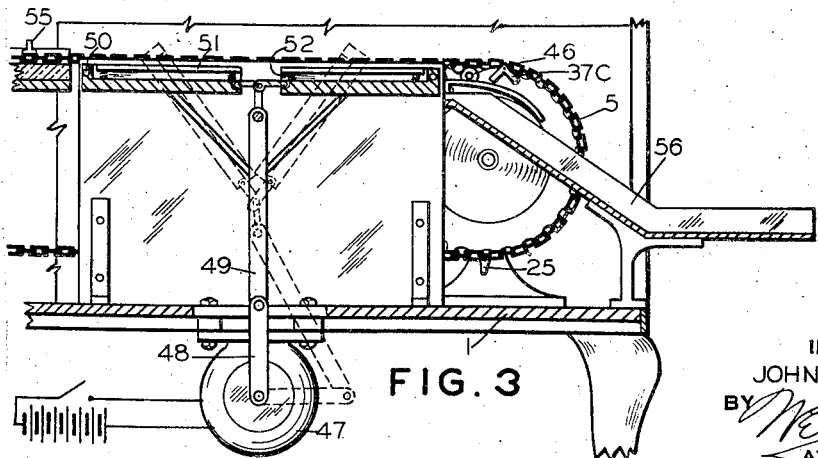
Fig. 3 is an enlarged longitudinal sectional view taken substantially on the line 3—3 in Fig. 2 and has particularly to do with the apparatus by which the halves of the sandwich are laid one upon the other and wrapped, the position of said mechanism being indicated in part in dotted lines.
Figure 10:
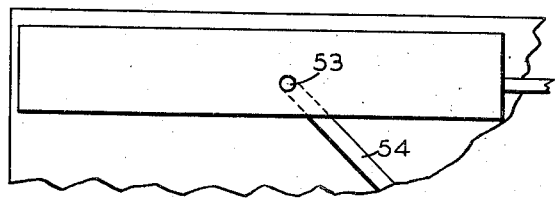
Figure 11:
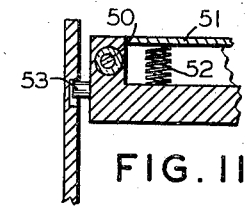
Figure 14:
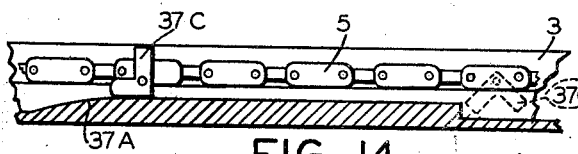
Fig. 14 is a sectional view taken on the line 14—14 in Figure 7.
Figure 17:
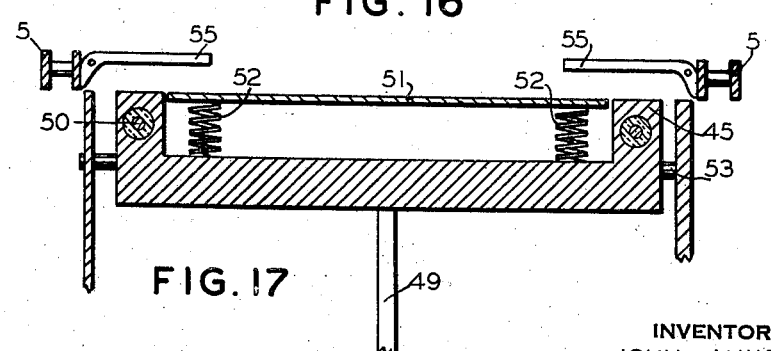
Fig. 17 is a sectional view taken substantially in the plane of Fig. 11, but with the devices for removing the finished sandwich shown superimposed thereover.

Each of said leaves is provided with a laterally-extending pin 53, which engages spaced obliquely-sloped grooves 54 and the grooves thus direct the folding action of said leaves, said parts being arranged in the manner shown in Fig. 10. When the leaves are again arranged so they form substantial continuations of the table 3, the enveloped sandwich lies upon the false bottom 51 and the switch 46 is opened by its time control mechanism when the element 55 sweeps said wrapped sandwich over the end of said wrapping mechanism into the chute 56. It is to be noted in Fig. 17 that the elements 55 are pivoted on the chain 5 and butt against the chain when said elements extend in horizontal planes. The pivotal mounting permits said elements to pass by the chute 56. The forward portion of said chute is inclined downwardly and is substantially horizontal at its rearward edge and thus the sandwich lies in said latter portion. The container wall divides said portions of the chute, the inclined portion lying within the container and the horizontal portion exteriorly thereof, as is shown in Fig. 3.

I claim:

1. A sandwich making machine comprising a conveyor, means for arranging slices of bread in spaced relation upon said conveyor, means for depositing sandwich material upon the face of one of said slices of bread and folding mechanism adapted to arrange said slices of bread in stacked relation.

2. A sandwich making machine comprising a conveyor, means for securing a web of paper to said conveyor, means for arranging slices of bread in spaced relation upon said web of paper, means for depositing sandwich material upon the face of one of said slices of bread and folding and wrapping mechanism adapted to arrange said slices of bread in stacked relation and packaged by said web of paper.

3. A sandwich making machine comprising a conveyor, means for arranging slices of bread in spaced relation upon said conveyor, means for depositing sandwich material and butter upon the faces of said slices of bread respectively and folding mechanism adapted to arrange said slices of bread in stacked relation.

4. In a sandwich making machine, a table defining an operating surface extending longitudinally of said machine, conveying mechanism, longitudinally spaced containers of sandwich materials overlying and discharging upon said operating surface, and a folder mechanism arranged at the discharge end of said conveying mechanism adapted to arrange the elements of sandwich material in stacked alinement.

5. In a sandwich making machine, a table defining an operating surface extending longitudinally of said machine, conveying mechanism, longitudinally spaced containers of sandwich material overlying and discharging upon said operating surface, said containers being laterally adjustable for selective alinement with said conveying mechanism, and a folder mechanism arranged at the discharge end of said conveying mechanism adapted to arrange the elements of sandwich material in stacked alinement.

6. In a sandwich making machine, a table defining an operating surface extending longitudinally of said machine, conveying mechanism, means adapted for feeding a supply of paper onto said conveying mechanism, longitudinally spaced containers of sandwich materials overlying and discharging upon said operating surface, a folder mechanism arranged at the discharge end of said conveying mechanism adapted to arrange the elements of sandwich material in stacked alinement, and a wrapping element associated with said folder mechanism and adapted to package said sandwich in said web of paper.

7. In a sandwich making machine, a table defining an operating surface extending longitudinally of said machine, conveying mechanism, means adapted for feeding a supply of waxed paper onto said conveying mechanism, longitudinally spaced containers of sandwich materials overlying and discharging upon said operating surface, a folder mechanism arranged at the discharge end of said conveying mechanism adapted to arrange the elements of sandwich material in stacked alinement, and a heating element associated with said folder mechanism and adapted to package said sandwich in said web of paper.

8. In a sandwich making machine, a table defining an operating surface extending longitudinally of said machine, conveying mechanism, means adapted for maintaining a supply of paper at the end of said table, means adapted for paying out said paper from said supply thereby to extend a web of said paper along said table, longitudinally spaced containers of sandwich materials overlying and discharging upon said operating surface, a folder mechanism arranged at the discharge end of said conveying mechanism adapted to arrange the elements of sandwich material in stacked alinement and a wrapping element associated with said folder mechanism and adapted to package said sandwich in said web of paper.

9. In a sandwich making machine, a table defining an operating surface extending longitudinally of said machine, conveying mechanism, means adapted for maintaining a supply of paper at the end of said table, means adapted for paying out said paper from said supply thereby to extend a web of said paper along said table, means for maintaining said web at substantially uniform tension, longitudinally spaced containers of sandwich materials overlying and discharging upon said operating surface, a folder mechanism arranged at the discharge end of said conveying mechanism adapted to arrange the elements of sandwich material in stacked alinement, and a wrapping element associated with said folder mechanism and adapted to package said sandwich in said web of paper.

10. In a sandwich making machine, a table defining an operating surface extending longitudinally of said machine, conveying mechanism, means adapted for maintaining a supply of paper at the end of said table, means adapted for paying out said paper from said supply thereby to extend a web of said paper along said table, a knife operatively connected to said conveying mechanism and adapted for periodic operation, longitudinally spaced containers of sandwich materials overlying and discharging upon said operating surface, a folder mechanism arranged at the discharge end of said conveying mechanism adapted to arrange the elements of sandwich material in stacked alinement, and a wrapping element associated with said folder mechanism and adapted to package said sandwich in said web of paper.

11. In a sandwich making machine, a table defining an operating surface extending longitudinally of said machine, conveying mechanism, nippers carried by said conveying mechanism, means adapted for maintaining a supply of paper at the end of said table, said nippers adapted for paying out said paper from said supply thereby to extend a web of said paper along said table, a knife operatively connected to said conveying mechanism and adapted for periodic operation, longitudinally spaced containers of sandwich materials overlying and discharging upon said operating surface, said containers being laterally adjustable for selective alinement with said conveying mechanism, and a wrapping element associated with said folder mechanism and adapted to package said sandwich in said web of paper.

12. In a sandwich making machine, a table defining an operating surface extending longitudinally of said machine, a pair of endless elements extending about said surface and along the sides thereof, inwardly extending nippers carried by said endless elements, means adapted for maintaining a supply of waxed paper at the end of said table, said nippers adapted for paying out said paper from said supply thereby to extend a web of said paper along said table, means for maintaining said web at substantially uniform tension, a knife operatively connected to said conveying mechanism and adapted for periodic operation, longitudinally spaced containers of sandwich materials overlying and discharging upon said operating surface, said containers being laterally adjustable for selective alinement with said conveying mechanism, a folder mechanism arranged at the discharge end of said conveying mechanism adapted to arrange the elements of sandwich material in stacked alinement and a heating element associated with said folder mechanism and adapted to package said sandwich in said web of paper.

JOHN ANKCORN.